C. P. LANDRETH.
ELECTROCHEMICAL APPARATUS.
APPLICATION FILED OCT. 14, 1914.

1,186,106.

Patented June 6, 1916.
4 SHEETS—SHEET 2.

C. P. LANDRETH.
ELECTROCHEMICAL APPARATUS.
APPLICATION FILED OCT. 14, 1914.

1,186,106.

Patented June 6, 1916.
4 SHEETS—SHEET 3.

C. P. LANDRETH.
ELECTROCHEMICAL APPARATUS.
APPLICATION FILED OCT. 14, 1914.

1,186,106.

Patented June 6, 1916.
4 SHEETS—SHEET 4.

INVENTOR
Clarence P. Landreth
BY Cornelius D. Ehret
ATTORNEY

//UNITED STATES PATENT OFFICE.

CLARENCE P. LANDRETH, OF PHILADELPHIA, PENNSYLVANIA.

ELECTROCHEMICAL APPARATUS.

1,186,106.

Specification of Letters Patent.

Patented June 6, 1916.

Application filed October 14, 1914. Serial No. 866,559.

*To all whom it may concern:*

Be it known that I, CLARENCE P. LANDRETH, a citizen of the United States, residing in the city of Philadelphia, county of Philadelphia, and State of Pennsylvania, have invented certain new and useful Improvements in Electrochemical Apparatus, of which the following is a specification.

My invention relates to apparatus for electrolytic or electro-chemical treatment of liquids, such as waters, sewage, effluents from factories, slaughter houses, etc.

My invention resides in apparatus of the character referred to as to the arrangement, interconnection or interrelation of the various parts; and my invention resides in the electrolytic or electro-chemical treating apparatus *per se*.

For an illustration of one of the various forms my invention may take reference is to be had in the accompanying drawings, in which.

Figure 1:
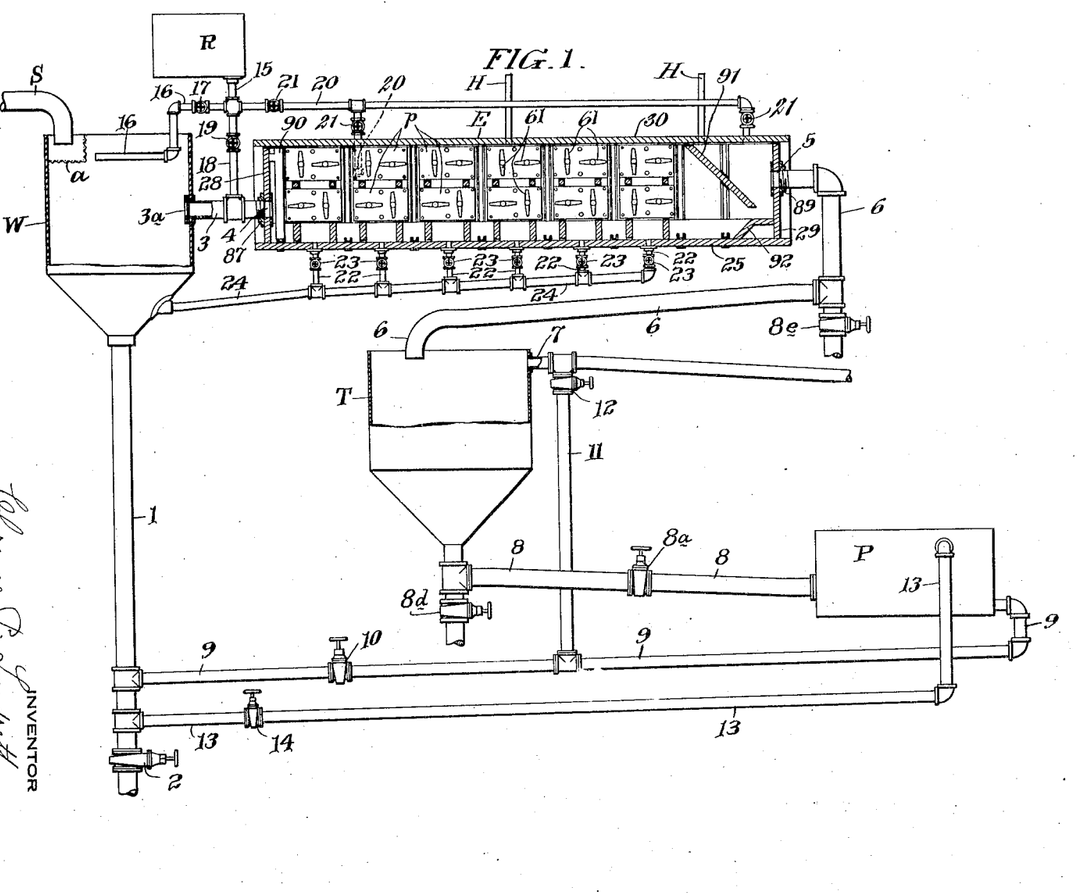
Figure 1 is a general view illustrating a treating system or apparatus in accordance with my invention, the same including my novel electrolytic or electro-chemical apparatus.

Referring to Fig. 1, S is the sewer, pipe or other conduit delivering the raw liquid, water, sewage, or the like, to the receiving well or tank W serving as a preliminary settling tank in which mud, sand, or objects carried by the received liquid settle out of the received liquid by gravity and may be drawn off through the pipe 1 controlled by the valve 2.

Connecting with the well W, preferably at a substantial distance above its bottom, is a pipe 3 provided with a screen $3^a$ for coarsely straining the liquid to prevent any large objects passing into the electrolytic treating apparatus E with which the pipe 3 connects at 4. The liquid passes through the electric treating apparatus E and leaves it at 5 through the pipe 6 which may deliver into the settling chamber or tank T, in which suspended matter, such as the sludge of sewage or other matter in suspension in the treated liquid may settle and collect at the bottom, the clear liquid or effluent passing out from near the top of tank T through pipe 7 to a stream, if the effluent is not to be used, or if to be used to the point where it is to be utilized.

From the bottom of the tank T the pipe 8 controlled by valve $8^a$ conveys the sediment or sludge to the press or drying apparatus P, which may be a filter press from which the separated liquid passes through pipes 9 and 11 and valve 12 to the pipe 7 where it passes off through pipe 7 with the effluent.

There communicates with the pipe 1 a pipe 13, controlled by valve 14, leading to the filter press or other device P whereby the coarse objects, sediment, sand, etc., may be carried from the well W through the pipe 1 and pipe 13 to be pressed or have the liquid separated therefrom, so that this solid matter may be carried away with the sludge or other sediment separated in the device P. For this operation, valves $8^a$ and 12 may be closed, and the valve 10 opened, whereupon the extracted untreated liquid is returned to pipe 1 to mingle with the raw liquid and be later treated with it.

R is a reagent tank adapted to contain any reagent, generally in solution, which may be introduced through the pipe 15 into the liquid to be electrically treated. From pipe 15 there is a connection into the well W through the pipe 16 controlled by valve 17 so that the reagent may be mixed with the raw liquid in the well W; or the reagent may be conducted from pipe 15 through pipe 18, controlled by valve 19, into the pipe 3 to be mixed with the liquid therein just before it enters the apparatus E. Or the reagent may be introduced from pipe 15 through the pipe 20, controlled by valve 21, connecting with the electrolytic treating chamber E at any suitable point, as beyond one or more of the banks of electrodes with which the liquid first comes into contact.

Any sediment, such as sand, precipitate, etc., which collects in the bottom of the apparatus E may be drawn off through the pipes 22, controlled by the valves 23, communicating with the pipe 24 which leads back into the receiving well W from which the sand, mud or sediment delivered through pipe 24 may be drawn off through pipe 1 with the other matter collected in the bottom of the well W, as above described. In the arrangement shown it will be noted that the liquid moves throughout its course by gravity, thus obviating the use of pumps or other liquid moving devices; though it is to be understood that it is within my invention to use a pump at any point where found necessary or desirable.

Figure 2:
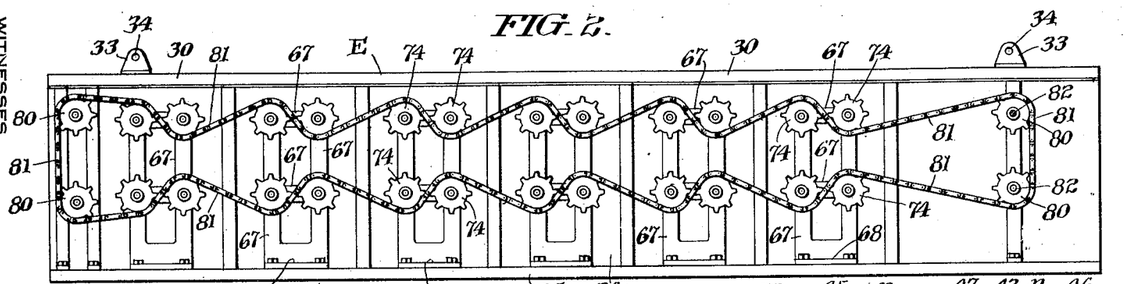
Fig. 2 is a side elevational view of the treating chamber or tank.
Figures 3, 4:
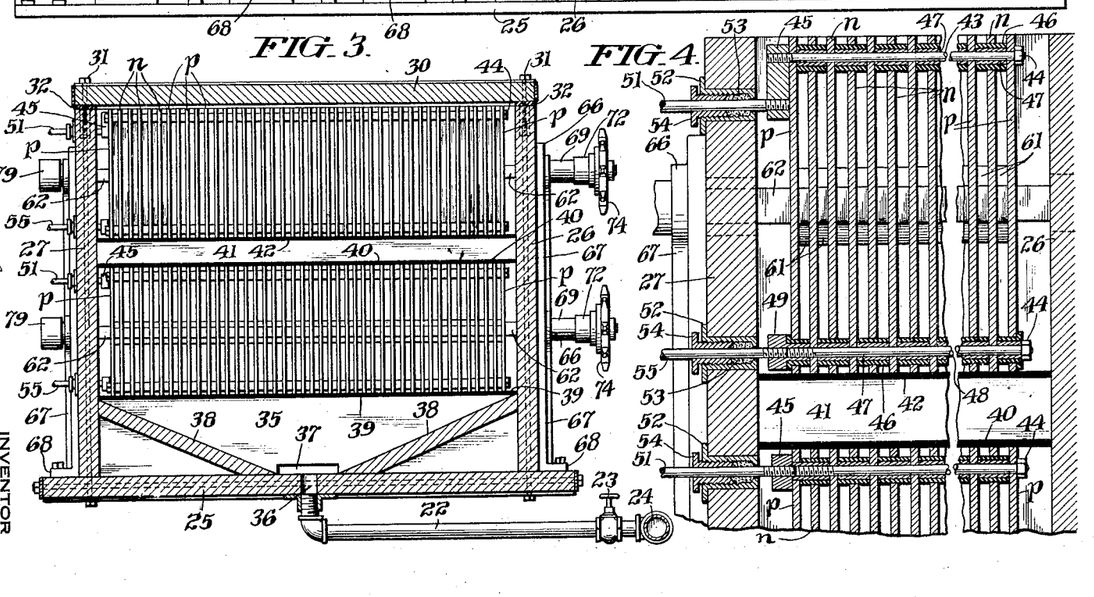
Fig. 3 is a cross sectional view, on larger scale, taken on the line 3—3 of Fig. 6.
Fig. 4 is a fragmentary cross sectional view, on still larger scale, taken on the line 4—4 of Fig. 6.

Referring now to Figs. 2 to 8 inclusive, E is the electrolytic treating chamber or tank, preferably of wood, though concrete or any other suitable material may be employed, comprising the bottom 25, sides 26, 27, ends 28 and 29, and, particularly when the liquid is required to rise to a higher level, a top or cover 30 may be secured to the sides 26 and 27 by bolts 31, packing or gaskets 32 intervening between them to make a gas and liquid tight joint. It will be understood, however, that tank E may be used without a cover 30. Upon the cover 30 may be one or more brackets 33 through which extend rods 34 to which chains or other means may be attached for lifting or removing the cover 30. Resting upon the bottom 25 and extending transversely of the tank E are the timbers or members 35 between pairs of which pipes 22 connect at the openings 36, alternate members 35 having in their lower edges the openings 37 through which mud, sand or other sediment may pass to an opening 36. And disposed between the members 35 are the timbers or plates 38 extending from the upper edges of the members 35 downwardly to the edges of the openings 37, these members 38 serving to guide sediment to the openings 36 and 37. Upon the upper edges of the members 35 are strips of insulating material 39 upon which rest at their lower edges the lower banks of positive and negative electrode plates $p$ and $n$, these electrodes having their faces vertical. Upon the upper edges of the lower electrodes are disposed strips of insulating material 40 upon which rest the transverse timbers or strips 41 upon which are disposed the strips of insulating material 42 upon which the upper banks of positive and negative electrodes $p$ and $n$ rest at their lower edges. The positive and negative electrodes of a bank preferably alternate, and all the positive electrode plates of an electrical bank may be connected together by conducting bolts 43 having at one end the nuts 44 and threaded at their other ends into metal blocks 45, as best seen in Fig. 4. Here the positive plates $p$ have small holes in alinement with each other through which the bolts 43 pass, the negative electrodes $n$ having large holes in which the bushings 46 of insulating material are placed, these bushings also serving as separators between neighboring positive plates $p$. And within the bushings 46 are the metallic bushings 47, also serving as separators and contacting with the plates $p$ and the bolts 43. At the lower edges of the electrodes the negative plates $n$ are connected together by similar bolts 48, having nuts 44 and screw threaded at their opposite ends into conducting blocks 49, in this case the negative plates $n$ having the small holes and the positive plates $p$ having the large holes in which are disposed the insulating bushings 46 and the inner metallic bushings 47. And at the corners of the electrode plates as indicated at 50, Figs. 6 and 8, they may be secured together and insulated from each other by separators 50ª. The bolts 43 and 48 serve to electrically interconnect the positive and negative electrodes respectively; electrical connection with the bolts 43 is made by conducting studs 51 screw threaded into the blocks 45 and extending through the stuffing box 52 provided with the packing 53 and the gland 54; and electrical connection is made with the bolts 48 by the conducting studs 55 extending through similar stuffing boxes and threaded into the blocks 49, the stuffing boxes serving to make liquid tight joints between the conducting studs 51 and 55 and the wall of the tank E.

Figure 5:
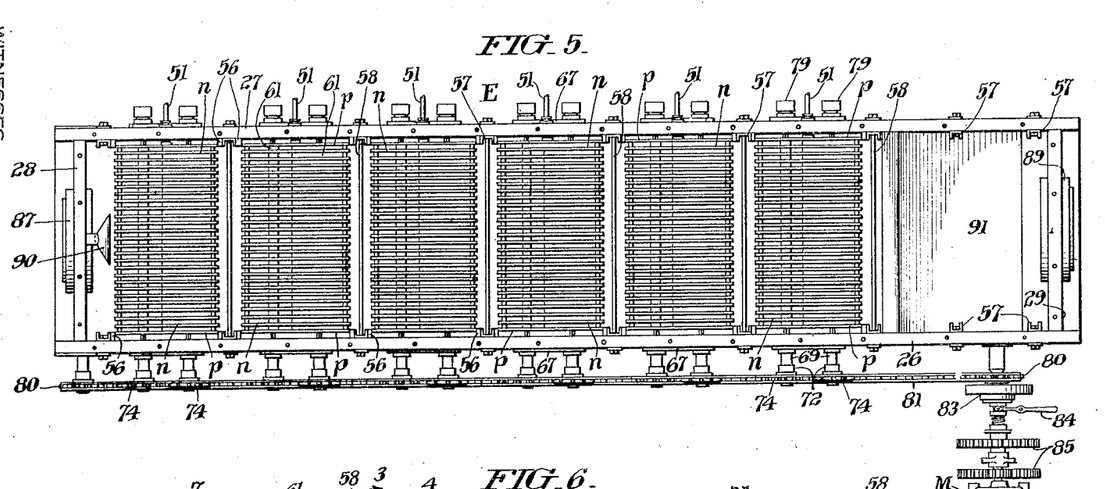
Fig. 5 is a top plan view of the apparatus shown in Fig. 2, with the top cover removed.
Figures 7, 8, 9, 10:
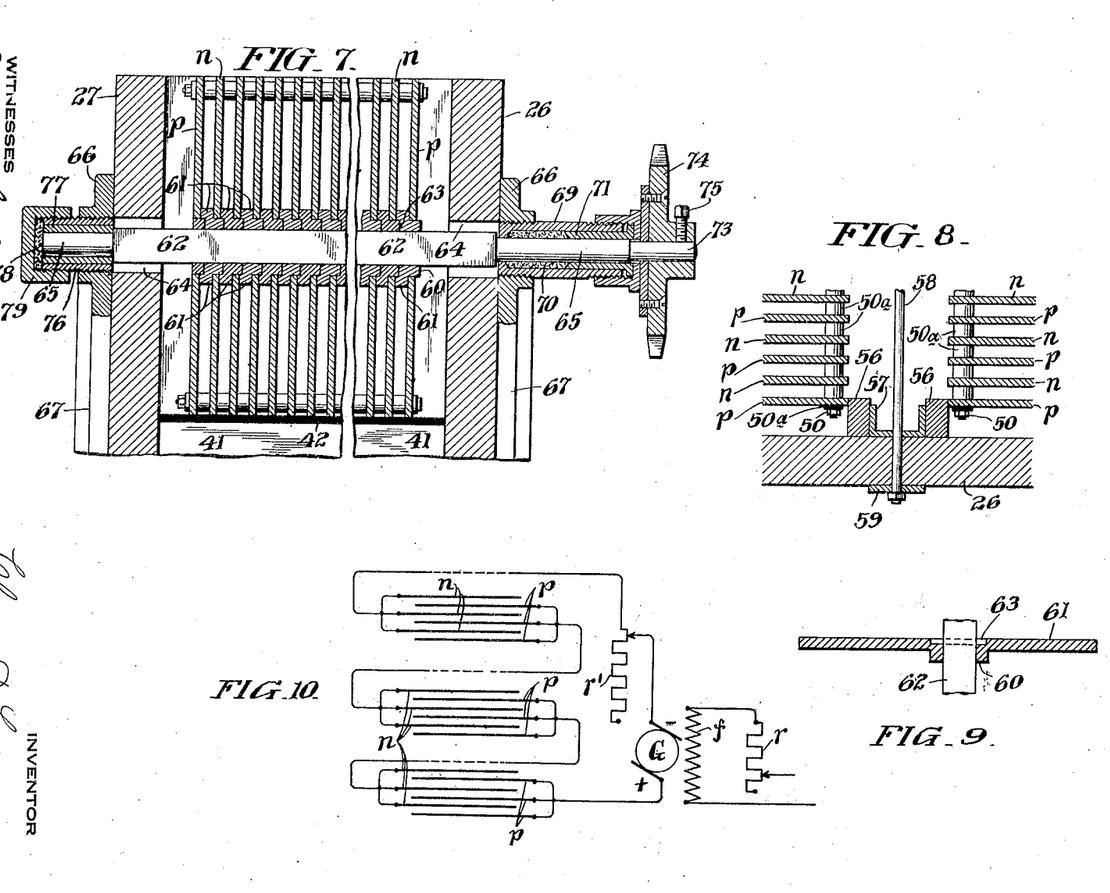
Fig. 7 is a cross sectional view, on large scale, taken on the line 7—7 of Fig. 6.
Fig. 8 is a horizontal sectional view, on enlarged scale, taken on the line 8—8 of Fig. 6.
Fig. 9 is a longitudinal section through a paddle.
Fig. 10 is a diagrammatic view illustrating one arrangement the electric circuits may take.

To properly space the electrodes longitudinally of the tank E, vertically disposed strips 56, preferably of wood, are secured to the inner faces of the tank walls 26 and 27, see Figs. 5 and 8. Between neighboring strips 56, and at other places beyond the electrodes, are disposed the metallic frames 57, here indicated as of channel section, each frame having a portion extending across the bottom 25 and vertically along the inner faces of the walls 26 and 27, these frames 57 serving as a skeleton or frame for the tank E whose sides 26 and 27 are drawn toward each other by bolts 58 extending through the sides 26 and 27 and the frames 57, a metal strap 59 being provided on the outsides. The electrodes $p$ and $n$ may have circular apertures, at any suitable number of places, two in the case here illustrated, within which rotate the bosses 60 on the paddles 61 which rotate between and substantially in contact with neighboring electrode plates, rotation being imparted by the square or otherwise suitably shaped shaft 62 extending through the bosses 60 of all the paddles of one set, each paddle having in its side opposite to the boss 60 a countersink 63 into which the boss 60 of the neighboring paddle fits. The side walls are apertured, as indicated at 64, Fig. 7, to permit free passage of the shafts 62 which have round end bearing portions 65. The apertures 64 are snugly covered by the parts 66 of the metal brackets or frames 67 secured in a vertical position against the tank walls 26 and 27, the frame 67 having horizontal flanges 68 bolted to that part of the bottom 25 projecting outwardly beyond the walls 26 and 27. Threaded into the parts 66 are the stuffing boxes 69 at one end of each of the shafts 62, the bearing 65 extending through the same and through the packing 70 which is confined at a gland 71 which also forms a bearing for the part 65 of the shaft, the gland being held in position by the cap 72 screw threaded to the box 69. On the shaft is an extension 73, passing through the cap 72, a sprocket wheel or other suitable preferably positive driving device 74 being secured to the extension 73 by the set screw 75. At the other end of each shaft there is screw threaded into the parts 66 a sleeve 76 within which is the bearing bushing 77 in which the shaft bearing 65 rotates. Over the end of the parts 76 and 77 is disposed packing 78 compressed and held in place by the cap 79 screw threaded to the sleeve 76. By this construction a liquid tight bearing is provided for all the paddle operating shafts.

At each end of the tank E is a pair of idler sprockets 80, a sprocket chain 81 engaging all the sprocket wheels 74 and the idlers 80 as indicated in Figs. 2 and 5, the sprocket chain 81 being preferably so applied to neighboring sprocket wheels 74 that they rotate the two sets of paddles for each bank of electrodes in opposite directions. One pair of idlers 80, for example that at the right end of tank E, are secured upon shafts 82, these shafts 82 being driven through a clutch 83, Fig. 5, controlled by lever 84, the driving member of the clutch being suitably driven through gearing 85 by the electric motor M or any other suitable driving means.

Figure 6:
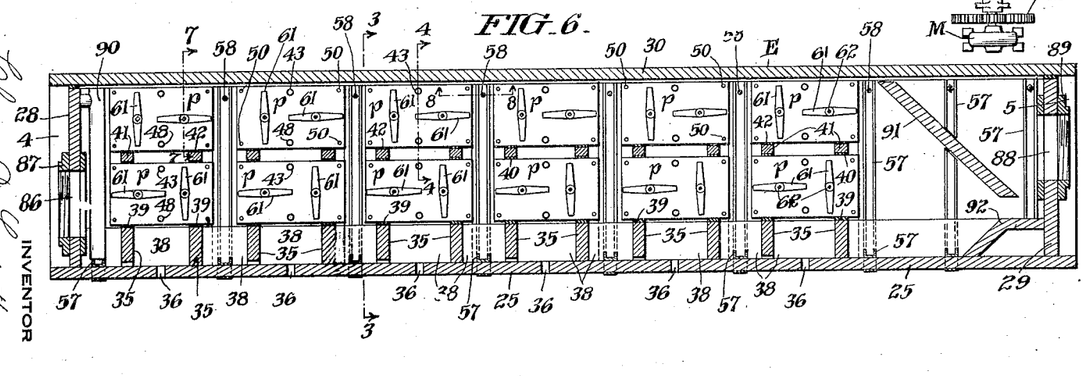
Fig. 6 is a longitudinal vertical sectional view through the apparatus shown in Figs. 2 and 5.

It will be noted from Fig. 6 that the paddles 61 of one set are disposed at right angles to the paddles of the other set for the same bank of electrodes; and that the paddles for the lower bank of electrodes are disposed respectively at right angles to the paddles of the banks of upper electrodes immediately above them, this being a suitable arrangement to allow easy liquid flow through the tank, though it will be understood that my invention is not limited thereto. In lieu of paddles, I may use any other suitable members partaking of rotary or reciprocating or other movement, to cleanse the electrode surfaces, to agitate the liquid and bring it into contact with the electrodes, and, with some liquids, to break up or finely divide solids or semi-solids therein. In the end 28 of the tank E is an aperture 86 with which the pipe 3, Fig. 1, communicates through the pipe flange 87. At the other end of the tank at 5 is a similar aperture 88 communicating with the pipe 6, Fig. 1, which is attached to the pipe flange 89. At 90 is shown an angular baffle disposed in front of the inlet orifice 86 to cause the fluid to sweep laterally in both directions and prevent masses of liquid standing at rest, or substantial rest, with only a central stream passing through the electrodes. In other words the baffle assists in causing all the arriving liquid to be more or less uniformly distributed to the various electrodes. At the other end of the tank E there is provided the downwardly extending baffle 91 which directs all the fluid toward the bottom of the apparatus and above the member 92. In the cover 30 may be provided a plurality of vents or pipe connections H for carrying off any gases, such as hydrogen, which may accumulate in the apparatus as the result of electrolytic treatment. And whether or not vents are employed, gas, as hydrogen, lifts scum and other matter to the surface of the liquid, and it passes along the tank with the gas in the clearance space between the cover and the liquid, and both gas and scum are carried out with the liquid by the downward deflection caused by the member 91. By this action, the gas cannot collect in the top of the tank to extent sufficient to form a gas pocket which would reach lower and lower and uncover the electrodes more and more.

The electrodes $p$ and $n$ may be connected in circuit in any suitable relation. By preference, however, the positive electrodes of each bank are electrically connected together, as are the negative electrodes, and the various banks of electrodes may be connected in series with each other, as indicated in Fig. 10, or may be connected in parallel with each other, or in series-parallel groupings, current being delivered by any suitable source of current, such as a direct current generator G having the field winding $f$ controlled by the adjustable resistance $r$, and adjustable resistance $r^1$ being connected in the circuit of the electrodes if desired. Variation of either of the resistances $r$, $r^1$, or both, will cause a variation of the current strength passed through the liquid between the electrodes, in some cases the current being increased, when the liquid under treatment contains free alkali, to produce hydroxid of the positive electrode material, generally iron, or the current may be reduced to such value that only nascent oxygen is produced under such alkaline conditions, as set forth in my co-pending application Serial Number 866,198, filed October 12, 1914 (Patented May 18, 1915, No. 1,139,778).

As set forth in Letters Patent No.

1,139,778, May 18, 1915, liquid, waters or sewage may be subjected to nascent oxygen by causing the same to contain free alkali and electrolyzing by passing the liquid between electrodes $p$ and $n$, and the positive electrodes $p$ for such purpose may be of material, such as carbon or platinum, which are unattackable, or they may be of metal, such as iron, copper, or other suitable metal or alloy, and by preference are plate steel. With suitable adjustment of the current strength at a given alkalinity of the liquid nascent oxygen only will be formed without forming iron hydroxid from the steel positive electrode. However, by keeping the alkalinity the same and increasing the current strength both nascent oxygen and hydroxid flock of the positive electrode metal will be formed. And with the same current strength the alkalinity may be still further increased, in which case the attack will be reduced or become substantially nothing and only the nascent oxygen produced.

The negative electrodes $n$ may in general be of any suitable material, such as carbon or metal, though because of cheapness the negative electrodes are generally also of plate steel.

The alkali, such as calcium hydroxid, sodium hydroxid, potassium hydroxid, or any other suitable material, is stored in the tank R and delivered into the liquid to be treated through either the pipe 16, pipe 18, or pipe 20, depending upon which of the valves 17, 19, or 21 is open, or they may be open in any combination. In general, however, reagent is introduced through the pipe 20 when one or more of the first groups of electrodes encountered by the liquid are of carbon, as may be the case when the liquid to be treated contains an ionizable salt, such, for example, as sodium chlorid, in which case hypochlorite is formed at the carbon electrodes, as well as oxygen, the hypochlorite acting as a germicide and assisting in the production of oxygen for oxidizing any oxidizable content. Or the apparatus described may be used for water softening, that is, for removing by electro-chemical treatment the incrustating salts in solution in the liquid or water; or it may be used for removing finely divided suspended matter, as, for example, described in my co-pending application Serial Number 43,909 filed August 6, 1915.

It will be understood that the raw liquid is introduced from the pipe S into the receiving well W, or directly into pipe 3, from which it passes by gravity or by pump through the electrolyzer E and thence through the pipe 6 into the sedimentation tank T where any precipitate or insoluble matter will settle, and the clear effluent passes off through the pipe 7 into a stream, or to the point where it is to be used. And the sediment, such as material carried down by flocculent, or any other material precipitated, may be discharged, or pass through pipe 8 to the drying apparatus P where the liquid is more or less completely extracted from the solid matter when desired, the extracted liquid flowing through pipe 9, and if the valve 12 is open, through the pipe 11 and out with the remainder of the effluent through pipe 7. And if the valve 14 is opened the preliminarily extracted sediment and coarse objects will pass from the bottom of well W through pipe 1 and through pipe 13 into the sludge or other solids drying apparatus P where this sediment and these objects will be introduced into the sludge and dried with it and then disposed of in any suitable way. And since this material arriving at the device P through pipe 13 contains raw untreated liquid, the liquid extracted can be passed back through pipe 9 into pipe 1 where its treatment in the apparatus E will be insured. It will be understood also that the raw liquid may be directly introduced into the electrolyzer E through pipe 3, without first passing into the receiving well W. And it will be further understood that the treated liquid may pass directly from the tank E to waste or other desired point through the valve $8^e$, without first going to the tank T. And it will be also understood that when it is not desired to separate the liquid from the sludge or sediment of tank T, the valve $8^a$ may be closed and the valve $8^d$ may be opened, allowing the contents of the tank T to flow directly to waste or other desired point. Between the delivery pipe S and the well W may intervene a screen $a$ which may collect any very large objects or masses in the delivered liquid or sewage.

This application is in part a continuation of my application Serial Number 844,103 filed June 9, 1914, which is in turn a continuation in part of my application Serial Number 804,796 filed December 5, 1913.

What I claim is:

1. The combination with means for delivering liquid, of means for coarsely straining the same, means for passing coarsely strained liquid between electrodes, means between said electrodes for mechanically subdividing the solids in the liquid, and a source of current connected to said electrodes.

2. The combination with means for delivering liquid, of means for coarsely straining the same, means for passing coarsely strained liquid between electrodes, a source of current connected to said electrodes, a sedimentation tank into which said liquid is delivered, a clear liquid discharge from said tank, a discharge from said tank for liquid containing suspended matter, and means for separating suspended matter from liquid connected to said last named discharge.

3. In a liquid treating system of the character described, the combination with a receiving tank, electrolyzing apparatus receiving liquid from said tank, a sedimentation tank receiving liquid from said electrolyzing apparatus, a clear liquid discharge from said sedimentation tank, a connection from said discharge to said receiving tank, a discharge from said sedimentation tank for liquid containing suspended matter, means connected with said last named discharge for separating suspended matter from liquid, and a liquid connection from said last named means to said clear liquid discharge.

4. In a liquid treating system of the character described, the combination with a receiving tank, electrolyzing apparatus receiving liquid from said tank, a sedimentation tank receiving liquid from said electrolyzing apparatus, a clear liquid discharge from said sedimentation tank, a connection from said discharge to said receiving tank, a discharge from said sedimentation tank for liquid containing suspended matter, means connected with said last named discharge for separating suspended matter from liquid, and a liquid connection from said last named means to said receiving tank.

5. In a liquid treating system of the character described, the combination with a receiving tank, electrolyzing apparatus receiving liquid from said tank, a sedimentation tank receiving liquid from said electrolyzing apparatus, a clear liquid discharge from said sedimentation tank, a discharge from said sedimentation tank for liquid containing suspended matter, means connected with said last named discharge for separating suspended matter from liquid, and a liquid connection from said last named means to said receiving tank.

6. In a liquid treating system of the character described, the combination with a receiving tank, electrolyzing apparatus receiving liquid from said tank, a sedimentation tank receiving liquid from said electrolyzing apparatus, a clear liquid discharge from said sedimentation tank, a discharge from said sedimentation tank for liquid containing suspended matter, means connected with said last named discharge for separating suspended matter from liquid, and a connection for delivering liquid containing suspended matter from said receiving tank to said last named means.

7. In a liquid treating system of the character described, the combination with a receiving tank, electrolyzing apparatus receiving liquid from said tank, a sedimentation tank receiving liquid from said electrolyzing apparatus, a clear liquid discharge from said sedimentation tank, a discharge from said sedimentation tank for liquid containing suspended matter, means connected with said last named discharge for separating suspended matter from liquid, a connection for delivering liquid containing suspended matter from said receiving tank to said last named means, and a liquid discharge from said last named means communicating with said clear liquid discharge.

8. In combination, means for delivering liquid, a receiving tank for the liquid, electrolytic treating apparatus, means for conveying said liquid from said tank to said electrolytic treating apparatus, means for introducing a re-agent into said liquid, a receptacle for the treated liquid, and means for separating the liquid from the solids of said treated liquid.

9. In combination, means for delivering liquid, a receiving tank for the liquid, electrolytic treating apparatus, means for conveying said liquid from said tank to said electrolytic treating apparatus, means for introducing a re-agent into said liquid, a sedimentation tank receiving the treated liquid, means connected with said sedimentation tank for separating the liquid from the solids collected in said sedimentation tank, and means for returning separated liquid to said receiving tank.

10. In liquid treating apparatus, the combination with a liquid receiving tank, of an electrolyzer into which liquid is delivered from said receiving tank, a sedimentation tank to which treated liquid is delivered, a clear liquid discharge from said sedimentation tank, and a connection from said sedimentation tank below said discharge for conveying sediment to means for extracting liquid from said sediment.

11. In liquid treating apparatus, the combination with a liquid receiving tank, of an electrolyzer into which liquid is delivered from said receiving tank, a sedimentation tank to which treated liquid is delivered, a connection from said tank for conveying sediment to means for extracting liquid from said sediment, and a connection from said last named means to said receiving tank.

12. In liquid treating apparatus, the combination with a liquid receiving tank, of an electrolyzer into which liquid is delivered from said receiving tank, a sedimentation tank to which treated liquid is delivered, a connection from said tank for conveying sediment to means for extracting liquid from said sediment, a connection for conveying sediment from said receiving tank to said last named means, and a connection from said means for conveying extracted liquid back into said receiving tank.

13. In liquid treating apparatus, the combination with a liquid receiving tank, of an electrolyzer into which liquid is delivered from said receiving tank, a sedimentation tank to which treated liquid is delivered, means for extracting liquid from sediment, a connection from said receiving tank for conveying sediment to said means, an effluent connection to said sedimentation tank, and a connection from said last named means to said effluent connection.

14. In liquid treating apparatus, the combination with a liquid receiving tank, of an electrolyzer in communication therewith, means for collecting sediment in said electrolyzer, and means for conveying said sediment back into said receiving tank.

15. In liquid treating apparatus, the combination with a liquid receiving tank, of an electrolyzer in communication therewith, said electrolyzer having a plurality of compartments in which sediment may collect, and connections from said compartments for conveying sediment back into said receiving tank.

16. In an electrolyzer, the combination with electrodes, of a sediment receiving pocket beneath said electrodes, and a paddle revolving between and parallel to said electrodes.

17. In an electrolyzer, the combination with electrodes having vertical faces, of a sediment receiving pocket disposed beneath said electrodes, and a paddle revolving between and parallel to said electrodes.

18. In an electrolyzer, the combination with a plurality of groups of electrodes, of sediment receiving pockets associated with said electrodes, and paddles revolving between and parallel to said electrodes.

19. In an electrolyzer, the combination with a plurality of groups of electrodes, of sediment receiving pockets associated with said electrodes, paddles revolving between and parallel to said electrodes, and connections from said pockets to a common sediment conductor.

20. In an electrolyzer, a plurality of vertical groups of electrodes, a horizontal tank in which said groups are disposed in succession longitudinally of said tank, and transversely extending sediment receiving pockets beneath said electrodes in said tank.

21. In an electrolyzer, vertical electrode plates and members movable vertically between and adjacent said electrode plates.

22. In an electrolyzer, vertical electrode plates, members movable vertically between and adjacent said plates, and a sediment receiving pocket beneath said plates.

23. In an electrolyzer, a plurality of groups of electrodes, a tank in which said groups are disposed, members disposed between the electrodes of each group, a mechanical connection to said members extending through the wall of said tank, and means connecting and driving all said mechanical connections.

24. In an electrolyzer, a tank, a plurality of electrodes disposed therein, said tank having a fluid inlet, and a member having inclined faces disposed between said inlet and said electrodes for spreading the inflowing liquid.

25. In an electrolyzer, the combination with a closed tank, of electrodes disposed therein, and a downwardly inclined wall deflecting the fluid after passing said electrodes.

26. In an electrolyzer, the combination with a horizontally extending tank, of electrodes therein, liquid influx and efflux openings in said tank, liquid spreading means intervening between the liquid influx opening and said electrodes, and means for deflecting the liquid downwardly after passing the electrodes intervening between said electrodes and said efflux opening.

27. In an electrolyzer, in combination with a tank, of an electrode disposed therein, a member movable with respect to said electrode, a shaft for driving said member, said shaft extending through the wall of said tank, a liquid tight connection between said shaft and said wall, and a bearing for said shaft in said connection.

28. The combination with a plurality of electrodes, of paddles disposed between said electrodes, a common driving shaft for said paddles, a boss on each paddle through which said shaft extends, said electrodes having apertures in which said bosses rotate.

29. The combination with a plurality of electrodes, of paddles disposed between said electrodes, a common driving shaft for said paddles, a boss on each paddle through which said shaft extends, said electrodes having apertures in which said bosses rotate, said paddles having countersinks receiving the bosses of neighboring paddles.

30. In an electrolyzer, the combination with a tank, a plurality of electrodes disposed in said tank, transversely extending pocket forming members in the bottom of said tank beneath said electrodes, and an outlet through the bottom of said tank through the space between said members.

31. In an electrolyzer, the combination with a tank, of a plurality of electrodes disposed in said tank, transversely extending pocket forming members in the bottom of said tank beneath said electrodes, and members inclining from the sides of said tank toward the center of the bottom of said tank between said transverse members.

32. In an electrolyzer, the combination with a tank, a plurality of electrodes disposed in said tank, transversely extending members in the bottom of said tank beneath said electrodes, and an outlet through the bottom of said tank through the space between said members, one or more of said transverse members having an aperture communicating with the space between them and neighboring transverse members.

33. In an electrolyzer, in combination with a tank, of a plurality of electrodes disposed in said tank, paddles between said electrodes, a mechanical connection to said paddles through the walls of said tank, frames on the outside of said tank supporting said mechanical connection, and means for driving said mechanical connections in unison.

34. In an electrolyzer, the combination with a closed tank, of electrodes disposed therein, and a downwardly inclined deflecting member, said tank having a clearance space beneath its cover and above said member.

35. In an electrolyzer, a closed tank through which liquid flows in a more or less horizontal direction, electrodes within said tank, and a member for deflecting the flowing liquid downwardly toward the tank outlet, said tank having a clearance space beneath its cover and above said member.

36. In an electrolyzer, a closed tank through which liquid flows in a substantially horizontal direction, electrode plates disposed vertically in said tank and extending longitudinally thereof, and a member for deflecting the flowing liquid downwardly toward the outlet end of said tank.

37. In an electrolyzer, the combination with a substantially horizontal closed tank, of electrodes disposed therein, said tank having a clearance space beneath its cover and above said electrodes.

38. In an electrolyzer, the combination with a substantially horizontal closed tank, of electrodes disposed therein, said tank having a clearance space beneath its cover and above said electrodes, and a gas outlet communicating with said clearance space.

39. In an electrolyzer, the combination with a substantially horizontal closed tank, of electrodes disposed therein, a downwardly inclined deflecting member, said tank having a clearance space beneath its cover and above said member, and a gas outlet communicating with said space.

40. In an electrolyzer, a substantially horizontal closed tank, electrodes within said tank, a member for deflecting the flowing liquid downwardly after passage beyond said electrodes, and a discharge outlet from said tank disposed above the lower end of said deflecting member.

In testimony whereof I have hereunto affixed my signature in the presence of the two subscribing witnesses.

CLARENCE P. LANDRETH.

Witnesses:
NELLIE FIELD,
ALICE S. MARSH.